United States Patent
Morrison et al.

(10) Patent No.: US 7,351,364 B2
(45) Date of Patent: Apr. 1, 2008

(54) METHOD OF MANUFACTURING A HYBRID STRUCTURE

(75) Inventors: Jay A. Morrison, Oviedo, FL (US); Gary B. Merrill, Orlando, FL (US); Steven James Vance, Orlando, FL (US); Michael A. Burke, Pittsburgh, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 428 days.

(21) Appl. No.: 10/767,012

(22) Filed: Jan. 29, 2004

(65) Prior Publication Data

US 2005/0167878 A1    Aug. 4, 2005

(51) Int. Cl.
*B28B 11/00* (2006.01)
*B28B 5/00* (2006.01)
*B29C 33/76* (2006.01)

(52) U.S. Cl. .............. 264/162; 264/163; 264/255; 264/313; 264/317; 264/610; 264/632; 264/635; 264/642; 264/678; 264/DIG. 44

(58) Field of Classification Search ............ None
See application file for complete search history.

(56) References Cited

U.S. PATENT DOCUMENTS

| | | | |
|---|---|---|---|
| 4,643,636 A | 2/1987 | Libertini et al. | |
| 4,790,721 A | 12/1988 | Morris et al. | |
| 4,907,946 A | 3/1990 | Ciokajlo et al. | |
| 4,975,225 A * | 12/1990 | Vivaldi et al. | 264/28 |
| 5,027,604 A | 7/1991 | Krueger | |
| 5,306,554 A | 4/1994 | Harrison et al. | |
| 5,314,309 A | 5/1994 | Blakeley et al. | |
| 5,331,816 A | 7/1994 | Able et al. | |
| 5,378,110 A * | 1/1995 | Ress, Jr. | 416/244 R |
| 5,382,453 A | 1/1995 | Mason | |
| 5,484,258 A | 1/1996 | Isburgh et al. | |
| 5,605,046 A | 2/1997 | Liang | |
| 5,636,508 A | 6/1997 | Shaffer et al. | |
| 5,640,767 A | 6/1997 | Jackson et al. | |
| 5,720,597 A | 2/1998 | Wang et al. | |
| 5,791,879 A | 8/1998 | Fitzgerald et al. | |
| 5,824,250 A | 10/1998 | Whalen et al. | |
| 5,881,775 A * | 3/1999 | Owen et al. | 138/149 |
| 5,962,076 A | 10/1999 | Mason et al. | |
| 6,013,592 A | 1/2000 | Merrill et al. | |

(Continued)

FOREIGN PATENT DOCUMENTS

WO    WO 01/21344    * 3/2001

*Primary Examiner*—Christina Johnson
*Assistant Examiner*—Jeff Wollschlager

(57) ABSTRACT

A method of manufacturing a hybrid structure (100) having a layer of CMC material (28) defining an interior passageway (24) and a layer of ceramic insulating material (18) lining the passageway. The method includes the step of casting the insulating material to a first thickness required for effective casting but in excess of a desired second thickness for use of the hybrid structure. An inner mold (14) defining a net shape desired for the passageway remains in place after the casting step to mechanically support the insulating material during a machining process used to reduce the thickness of the insulating material from the as-cast first thickness to the desired second thickness. The inner mold also provides support as the CMC material is deposited onto the insulating material. The inner mold may include a fugitive material portion (20) to facilitate its removal after the CMC material is formed.

10 Claims, 2 Drawing Sheets

U.S. PATENT DOCUMENTS

| | | |
|---|---|---|
| 6,174,565 B1 | 1/2001 | Daws et al. |
| 6,197,424 B1 | 3/2001 | Morrison et al. |
| 6,238,617 B1 * | 5/2001 | Strasser et al. ............. 264/624 |
| 6,287,511 B1 | 9/2001 | Merrill et al. |
| 6,325,593 B1 * | 12/2001 | Darkins et al. ............. 415/115 |
| 6,350,404 B1 * | 2/2002 | Li et al. ..................... 264/635 |
| 6,365,281 B1 | 4/2002 | Subramanian et al. |
| 6,451,416 B1 * | 9/2002 | Holowczak et al. ..... 428/293.4 |
| 6,626,230 B1 * | 9/2003 | Woodrum et al. .......... 164/516 |
| 6,709,230 B2 * | 3/2004 | Morrison et al. ........... 415/115 |
| 6,733,907 B2 * | 5/2004 | Morrison et al. ........... 428/699 |
| 6,776,219 B1 * | 8/2004 | Cornie et al. ............... 164/516 |
| 6,830,724 B2 * | 12/2004 | Kobashi et al. ................ 419/5 |
| 2002/0053758 A1 | 5/2002 | Lobardi et al. |
| 2004/0214051 A1 * | 10/2004 | Morrison et al. ........... 428/701 |
| 2005/0076504 A1 * | 4/2005 | Morrison et al. ........ 29/889.72 |
| 2005/0241148 A1 * | 11/2005 | Vance ...................... 29/889.2 |

* cited by examiner

METHOD OF MANUFACTURING A HYBRID STRUCTURE

FIELD OF THE INVENTION

This invention relates generally to the field of materials technology, and more particularly to the field of high temperature ceramics, and specifically to methods for manufacturing ceramics that can be used in the field of gas turbines.

BACKGROUND OF THE INVENTION

It is known to apply a ceramic insulating material over the surface of a component exposed to gas temperatures that exceed the safe operating temperature range of the component substrate material. Metallic combustion turbine (gas turbine) engine parts (e.g. nickel, cobalt, iron-based alloys) are routinely coated with a ceramic thermal barrier coating (TBC).

The firing temperatures developed in combustion turbine engines continue to be increased in order to improve the efficiency of the machines. Ceramic matrix composite (CMC) materials are now being considered for applications where the temperature may exceed the safe operating range for metal components. U.S. Pat. No. 6,197,424, assigned to the present assignee, describes a gas turbine component fabricated from CMC material and covered by a layer of a dimensionally stable, abradable, ceramic insulating material, commonly referred to as friable graded insulation (FGI). Hybrid FGI/CMC components offer great potential for use in the high temperature environment of a gas turbine engine, however, the full value of such hybrid components has not yet been realized due to their relatively recent introduction to the gas turbine industry.

Combustor liners and transition ducts are gas turbine components that have a generally tubular shape defining an interior passageway through which hot combustion gasses flow. FIG. 1 is a side view of a prior art combustor transition duct 10. Such components may be formed of an annular CMC structural member having a layer of ceramic insulating material bonded to its inside surface. Such structures are difficult to manufacture due to their complex geometry and the need for inside surface machining.

DETAILED DESCRIPTION OF THE INVENTION

Figure 1:
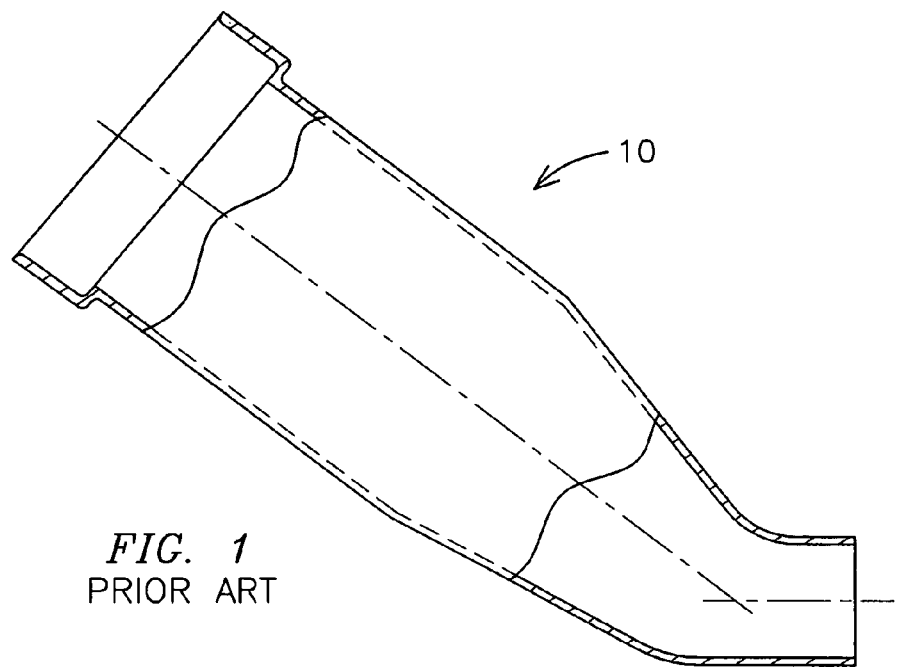
FIG. 1 is a side view of a prior art combustor transition duct.
Figure 2:
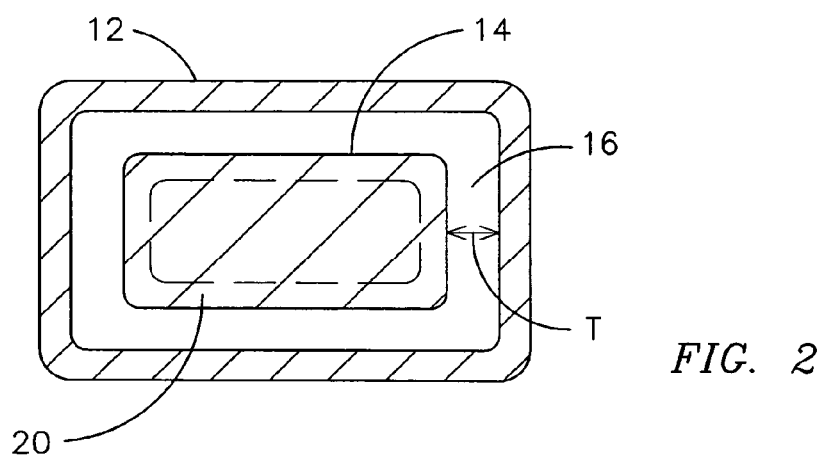
FIGS. 2 through 7 are partial cross-sectional views of a hybrid structure and tooling used to form the hybrid structure at various stages in a manufacturing process.
Figure 3:
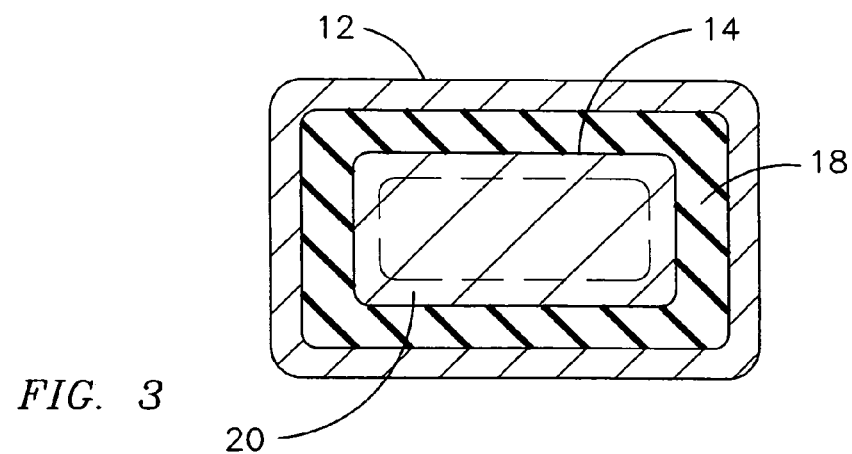

FIGS. 2 through 7 illustrate steps in a method that may be used to fabricate a hybrid structure 100 (illustrated in cross-section in its final form in FIG. 7) such as a gas turbine combustor or transition duct. FIG. 2 is a partial cross-sectional view of tooling used to fabricate hybrid structure 100, in particular an outer mold 12 surrounding an inner mold 14 to define an annular cavity 16. The cavity 16 receives an insulating material 18 during a casting process, as shown in FIG. 3. The insulating material 18 may be a ceramic insulating material suitable for exposure to hot combustion gasses in a gas turbine engine, or the precursor of such a system in that it should be dried and fired from its as-cast form into rigidity, such as the insulating material described in U.S. Pat. No. 6,197,424, incorporated by reference herein. The outer mold 12 and/or the inner mold 14 may be formed at least partially of a porous material to accelerate moisture removal during drying of the insulating material 18, as is known in the art of ceramics casting.

The inner mold 14 may have a fugitive material portion 20. The fugitive material portion 20 may form only a portion of the inner mold 14 or the entire tool may be formed of the fugitive material. As used herein, the term fugitive material includes any material that is thermally and dimensionally stable enough to support insulating material 18 through a first set of manufacturing steps, and that can then be transformed and removed by a means that does not harm the insulating material 18, such as by melting, vaporizing, dissolving, leaching, crushing, abrasion, crushing, sanding, etc. In one embodiment, the fugitive material may be styrene foam that can be partially transformed and removed by mechanical abrasion and light sanding, with complete removal being accomplished by heating. Because the inner mold 14 contains a fugitive material portion 20, it is possible to form the cavity 16 to have a large, complex shape, such as would be needed for a gas turbine transition duct, while still being able to remove the inner mold 14 after the insulating material 18 has solidified around the inner mold 14. The inner mold 14 may consist of hard, reusable tooling with an outer layer of fugitive material 20 of sufficient thickness to allow removal of the permanent tool after the transformation/removal of the fugitive material portion 20. The reusable tool may be formed of multiple sections to facilitate removal from complex shapes.

Inner mold 14 may be formed to define a net shape desired for the final use of the insulating material 18; i.e. net shape casting that eliminates the need for any further shaping of the inside surface 22 of the insulating material 18 after the inner mold 14 is removed. In certain embodiments it may be desired to perform a mechanical process such as machining, grinding, sanding, or other shaping of the inside surface 22 after the inner mold 14 is removed. However, for embodiments such as a combustor transition duct wherein the inside surface 22 defines a relatively long, narrow passageway 24, it may be beneficial to form the inner mold 14 to have a desired net shape or near net shape so that such further mechanical processing of the interior surface is eliminated or minimized.

For a coarse-grained refractory materials, effective casting thicknesses are generally not much less than ten times the grain size, otherwise the grains may not achieve a random distribution within the casting. For example, 1.5 mm diameter hollow ceramic spheres used in the friable-grade insulation described in U.S. Pat. No. 6,197,424 require that this material be cast with a minimum thickness of about 15 mm. Thus, the cavity 16 defined between the outer mold 12 and the inner mold 14 must have a thickness T of about 15 mm when this material is used. The desirable thickness of this material when disposed over a CMC component in the hot gas path of a modern gas turbine engine may be only 3-8 mm. Such thicknesses are typically inadequate to provide mechanical support of the weak insulating layer for subsequent process operations such as machining, CMC lay-up, etc. To achieve effective casting and also to facilitate further processing of the insulating material 18, the present inventors exploit the mechanical support provided by the molding tooling for process steps subsequent to the casting operation.

Figure 4:
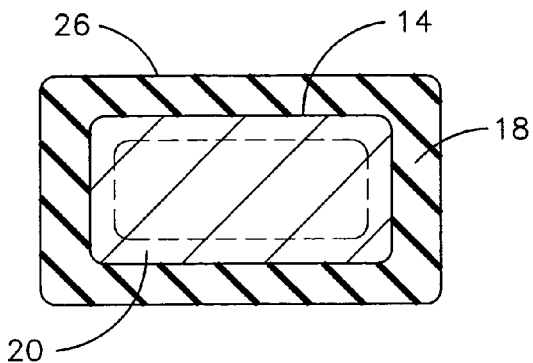

After the insulating material 18 is cast into cavity 16 and allowed to dry, the outer mold 18 is removed to expose the outer surface 26 of the layer of insulating material 18, as illustrated in FIG. 4. The inner mold 14 remains in place for mechanically supporting the insulating material 18 during any subsequent mechanical step, such as handling, machining, grinding, sand blasting, etc.

Figure 5:
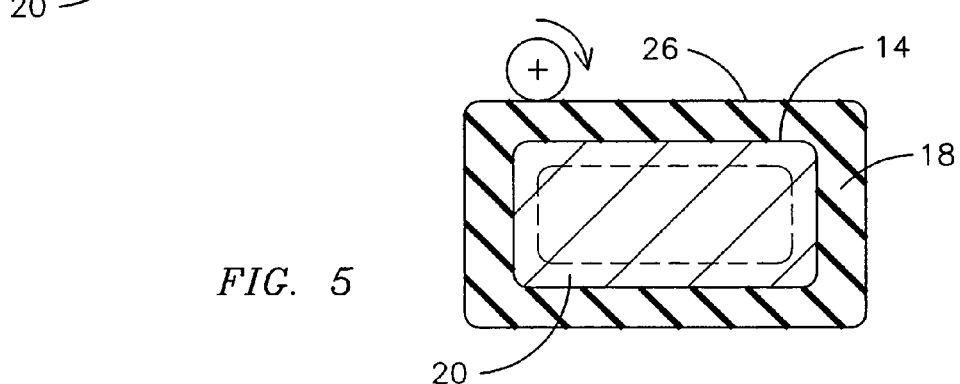
Figure 6:
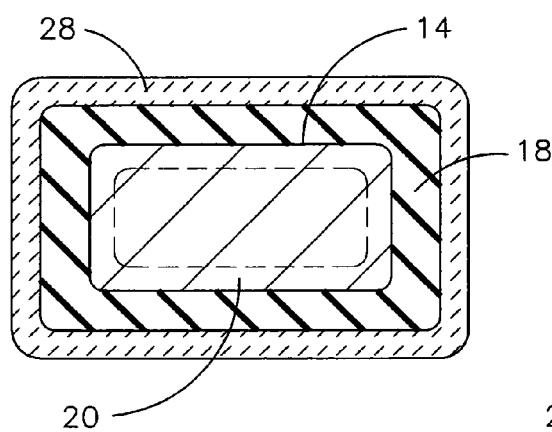

Advantageously, the thickness of the layer of insulating material 18 may be reduced to a desired value by a mechanical process such as machining the insulating material 18 in its green state with the inner mold 14 in place, as illustrated in FIG. 5. The outer surface 26 is prepared as necessary for receiving a layer of ceramic matrix composite (CMC) material 28, as illustrated in FIG. 6, with the inner tool 14 remaining in place to provide support for the layer of insulating material 18 during the CMC lay-up process. The CMC lay up process can be taken to mean the application of any CMC precursor form including but not limited to fiber tows, fabric strips or fabric sheets that can be applied by either hand or machine processes to conform to the molded structure before consolidation processing. The CMC material 28 may be any known oxide or non-oxide composite. It may be desired to at least partially cure the insulating material 18 prior to applying the layer of CMC material 28 and/or to partially cure the CMC material 28 prior to removing the inner mold 14. The curing temperature during such steps must be less than a transformation temperature of the fugitive material portion 20 of inner mold 14 if the fugitive material is one that is transformed by heat so that the mechanical support provided by the inner mold 14 is maintained. Consecutive layers of the CMC material may be applied to build rigidity and strength into the structure.

Figure 7:
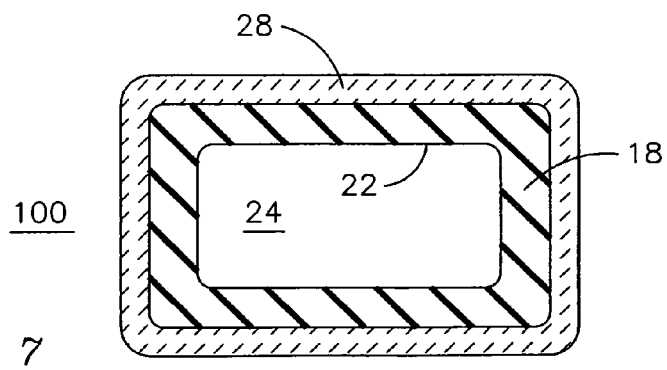

The layer of ceramic matrix composite material 28 may provide adequate mechanical support for the insulating material 18, thereby allowing the inner tool 14 to be removed. Alternatively, the inner mold 14 may remain in place through the entire processing of the hybrid structure 100. At an appropriate point in the manufacturing process, the fugitive material portion 20 of inner mold 14 is transformed, the inner mold 14 removed, and the hybrid structure 100 processed to its final configuration as shown in FIG. 7.

If the insulating material 18 is not machineable in its green state, or if the fugitive material 20 is not stable at a desired interim firing temperature, the fugitive material 20 and inner mold 14 may be removed prior to an interim firing step, and a second inner mold may be installed after the interim firing for support during a subsequent mechanical processing step, such as machining or applying a layer of CMC material. The fugitive material portions 20 of the first and second inner molds 14 do not necessarily have to be the same material. For example, the fugitive material 20 used in the second tool may be specially selected to be compatible with chemicals used in a machining fluid.

While various embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of manufacturing comprising:
    defining a cavity between an inner mold comprising a fugitive material portion and an outer mold;
    casting a layer of ceramic insulating material within the cavity;
    removing the outer mold;
    performing a mechanical process on the layer of ceramic insulating material while the inner mold remains in place for mechanically supporting the layer of ceramic insulating material;
    removing the fugitive material and removing the inner mold;
    at least partially curing the layer of ceramic insulating material after the inner mold has been removed; and
    installing a second inner mold comprising a fugitive material portion for supporting the ceramic insulating material during a subsequent process step.

2. The method of claim 1, wherein the fugitive material portion of the inner mold used during the step of casting comprises a material different from the fugitive material portion of the second inner mold.

3. The method of claim 1, further comprising applying a layer of ceramic matrix composite material to the layer of ceramic insulating material after the second inner mold is installed.

4. A method of manufacturing a gas turbine component comprising a ceramic matrix composite material member defining a passageway and a layer of ceramic insulating material protecting the ceramic matrix composite member from high temperature gas passing through the passageway, the method comprising:
    defining an annular cavity having a first thickness dimension between an inner mold and an outer mold;
    casting ceramic insulating material within the cavity to have a first thickness dimension;
    removing the outer mold;
    removing a portion of the ceramic insulating material to reduce the ceramic insulating material to a second thickness dimension smaller than the first thickness dimension while the inner mold remains in place mechanically supporting the ceramic insulating material;
    forming a layer of ceramic matrix composite material on an outer surface of the ceramic insulating material; and
    removing the inner mold; further comprising:
    performing the step of defining an annular cavity using a first inner mold;
    removing the first inner mold after the step of casting;
    at least partially curing the ceramic insulating material after the step of removing the first inner mold; and
    installing a second inner mold for supporting the ceramic insulating material prior to the step of removing a portion of the ceramic insulating material.

5. The method of claim 4, further comprising:
    forming the first inner mold to have a fugitive material portion; and
    transforming the fugitive material portion prior to the step of removing the first inner mold.

6. The method of claim 4, further comprising at least partially curing the first ceramic insulating material while the inner mold remains in place prior to the step of removing a portion of the ceramic insulating material.

7. The method of claim 4, further comprising forming the second inner mold of a material different than a material of the first inner mold.

8. The method of claim 4, further comprising performing a mechanical process on an inside surface of the ceramic insulating material after the step of removing the first inner mold.

9. The method of claim 4, further comprising forming the first inner mold to have a net shape desired for the passageway.

10. The method of claim 4, further comprising forming the first thickness dimension to be at least 15 mm and removing a sufficient portion of the ceramic insulating material to reduce the ceramic insulating material to a thickness of 3-8 mm while the first inner mold remains in place.

* * * * *